United States Patent
El-Shoubary et al.

[11] Patent Number: 6,120,579
[45] Date of Patent: *Sep. 19, 2000

[54] PROCESS FOR CLEANING MERCURY-CONTAMINATED SOILS

[75] Inventors: Youssef El-Shoubary, North Brunswick; Subash C. Seth, Watchung; William F. Lavosky, Brielle; Ned A. Speizer, Brick, all of N.J.

[73] Assignee: Merck & Co., Inc., Rahway, N.J.

[*] Notice: This patent is subject to a terminal disclaimer.

[21] Appl. No.: 09/152,774

[22] Filed: Sep. 14, 1998

Related U.S. Application Data

[60] Provisional application No. 60/059,447, Sep. 22, 1997.

[51] Int. Cl.[7] .................................................. C22B 43/00
[52] U.S. Cl. ............................................. 75/742; 423/109
[58] Field of Search ................................ 75/742; 423/109

[56] References Cited

U.S. PATENT DOCUMENTS

| | | |
|---|---|---|
| 1,637,481 | 8/1927 | Glaeser . |
| 1,731,699 | 10/1929 | Cavalli . |
| 3,476,552 | 11/1969 | Parks et al. . |
| 3,627,482 | 12/1971 | Olson et al. . |
| 3,755,110 | 8/1973 | Wygasch et al. . |
| 3,785,942 | 1/1974 | Carlson et al. . |
| 4,124,459 | 11/1978 | Blanch et al. . |
| 4,923,125 | 5/1990 | Bateson et al. . |
| 5,013,358 | 5/1991 | Ball et al. . |
| 5,183,499 | 2/1993 | Chintis . |
| 5,209,774 | 5/1993 | Rockandel et al. . |
| 5,226,545 | 7/1993 | Foust et al. . |
| 5,244,492 | 9/1993 | Cyr . |
| 5,266,494 | 11/1993 | Lahoda et al. . |
| 5,268,128 | 12/1993 | Lahoda et al. . |
| 5,300,137 | 4/1994 | Weyand et al. . |
| 5,303,871 | 4/1994 | Bateson et al. . |
| 5,314,527 | 5/1994 | Rocklandel et al. . |
| 5,342,449 | 8/1994 | Holbein et al. . |
| 5,436,384 | 7/1995 | Grant et al. . |
| 5,494,649 | 2/1996 | Fristad et al. . |
| 5,968,461 | 10/1999 | El-Shoubary et al. ............... 75/742 |

OTHER PUBLICATIONS

Perry, R.A., "Mercury Recovery from Process Sludges," Chem. Eng. Progress, vol. 70, pp. 73–80 (1974).

Charlton, D.S. et al., "Commercial Mercury Remediation Demonstrations: Thermal Retorting and Physical Separation/Chemical Leaching," Gas Research Institute, Environment and Safety Research Group (1997).

Stepan, D.J. et al., "Remediation of Mercury–Contaminated Soils: Development and Testing of Technologies," Gas Research Institute, Environment and Safety Research Group (1995).

Stepan, D.J. et al., "Remediation Technologies Applicable to Mercury Contamination at Natural Gas Industry Sites–Database Update," Gas Research Institute, Environment and Safety Research Group (1995).

Mulchandani, A.K. et al., "Studies in Removal of Mercury from Brine Mud," Chemical Age of India, vol. 31, No. 5, pp. 495–498 (1980).

Yang, M. et al., "Feasibility of extracting lead, cadmium, mercury, copper and zinc form soil using anhydrous ammonia," J. of Hazardous Materials, vol. 28 (1–2), pp. 212–213 (1991).

*Primary Examiner*—Melvyn Andrews
*Attorney, Agent, or Firm*—Elliott Korsen; Mark R. Daniel

[57] ABSTRACT

The present invention relates to a process for cleaning mercury-contaminated soils that is simple, efficient and safe to use. This process can also be used to clean soils contaminated with additional metals, such as zinc, copper and lead, at a lower pH. The invention involves treating contaminated soils with solid hypochlorite in a continuous counter-current process.

18 Claims, 4 Drawing Sheets

PROCESS FOR CLEANING MERCURY-CONTAMINATED SOILS

This application claims the benifit of Provisional application Ser. No. 60/059,447 filed Sep. 22, 1997.

BACKGROUND OF THE INVENTION

Because of the toxicity of mercury, there is great concern over any discharge of mercury into the environment. Until relatively recently, chemical plants did not take the necessary precautions when disposing of materials containing mercury. As a result, the soils and waters surrounding these plants are often contaminated with mercury or mercury compounds. The process of cleaning soils contaminated with metals is difficult since metals are strongly absorbed or even diffused inside the pores of the soil matrix. Additionally, metallic mercury and most mercury species are not soluble in water.

If mercury exists in the soils in the presence of other metals, the removal process is even more costly and complicated. The price of disposing contaminated soils has increased dramatically in the past few years, particularly for disposal of mercury-contaminated soils, due to local, state and federal environmental regulations which restrict such disposal. Today, agencies that administer sites will usually require that the contaminated soils be treated rather than disposed of. In most cases, more than one process technology is required to clean up the soils to meet federal and local standards, especially if more than one metal is present in the soils. This makes the clean up of the site more difficult, time consuming and expensive.

Several methods have been developed to recover the mercury from the solid materials. U.S. Pat. Nos. 5,314,527, 5,013,358 and 3,755,110 disclose processes that remove mercury from muds, sludge or other materials containing mercury compounds. However, most of these methods are complex and/or inefficient. Some even resulted in the discharge of a dangerous mercury vapor into the environment.

It is therefore the object of this invention to provide a safe and efficient process for cleaning mercury-contaminated soils.

Another object of this invention is to provide an easy, economical and efficient process that can be used to clean soils contaminated with additional metals, such as zinc, copper and lead.

SUMMARY OF THE INVENTION

The present invention relates to a process for cleaning mercury-contaminated soils. In particular, the present invention uses a counter current continuous process that utilizes a solid hypochlorite. This invention alleviates the drawbacks of previous processes by providing a simple, efficient method that is safe to use. This process can also be used to clean soils contaminated with additional metals, such as zinc, copper and lead, at a lower pH.

DETAILED DESCRIPTION OF THE INVENTION

Figure 1:
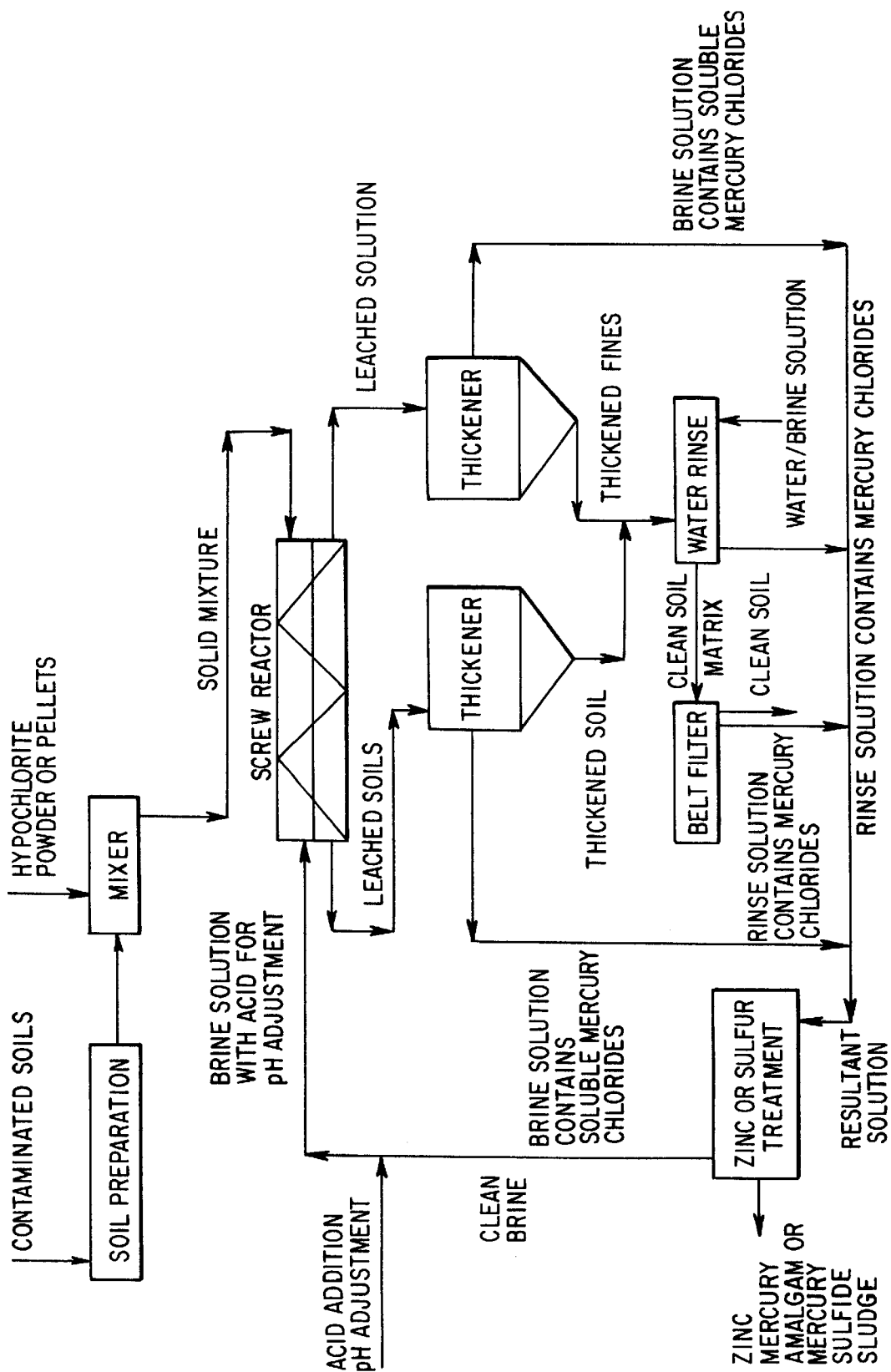
FIG. 1 is a schematic representation of the mercury recovery process.

The invention relates to a process for cleaning mercury-contaminated soils comprising:
- a. mixing the mercury-contaminated soils with a solid hypochlorite salt, producing a solid mixture;
- b. preparing a brine solution and mixing the brine solution with acid to adjust the pH, forming a liquid mixture;
- c. directing the solid mixture to a screw reactor;
- d. feeding the liquid mixture to the screw reactor in a direction countercurrent to the solid mixture;
- e. leaching the solid mixture with the liquid mixture, producing leached soils and a solution containing soluble compounds and fines;
- f. thickening the leached soils to separate the soils from the leaching solution;
- g. thickening the leached solution to separate the fines from the solution;
- h. combining the thickened soils and thickened fines to produce a soil matrix;
- i. rinsing the soil matrix with brine solution, water or both to recover any residual soluble mercury compounds and to produce a clean soil matrix;
- j. filtering the clean soil matrix to recover any solution held in the clean soil matrix;
- k. mixing the filtered solution with the thickened solutions from steps (f) and (g) to produce a resultant solution;
- l. treating the resultant solution with zinc powder or sulfide compound to produce clean brine and a mercury-zinc amalgam or a mercuric sulfide compound;
- m. recycling the clean brine back to the process; and
- n. recovering the mercury-zinc amalgam or the mercuric sulfide compound.

In a second embodiment of the present invention, the process can be used to clean soil contaminated with other metals, such as zinc, lead and copper, by lowering the pH of the brine solution with the addition of more acid.

Although metallic mercury and most mercury species are not soluble in water, mercury chlorides are very soluble at normal pressure and temperature. By keeping the mercury-contaminated soils in constant contact with solid hypochlorite salt, most of the mercury species can be converted to mercury chlorides, which can be recovered using a water or brine rinse.

By using dry, solid hypochlorite in the form of powder or pellets, instead of liquid hypochlorite, the soil is continuously supplied with a constant concentration of hypochlorite. This reduces the number of stages and contact time required to clean the soil. It also improves the efficiency of the chloride reaction. Additionally, the water balance using the solid hypochlorite salt is favorable and the reaction path is faster since the hypochlorite concentration will remain constant in the soils at all times.

In the instant invention, the pellet mesh size of the solid hypochlorite should be determined based on the mercury concentration and the type of mercury species that exist in the soil. In practicing this method, several types of solid hypochlorite salts can be used, including, but not limited to, calcium hypochlorite, lithium hypochlorite and magnesium hypochlorite. Preferably, solid calcium hypochlorite is used.

Another added benefit of using solid hypochlorite instead of liquid hypochlorite is the reduction of the risk of spills occurring on site. Solid calcium hypochlorite is particularly efficient since calcium is a coagulant which makes the filtration of the soils easier. In addition, the formation of various calcium compounds that might be adsorbed on soil surfaces can prevent diffusion of residual metals from the pores of the cleaned soils.

The types of acid used in the process may include, but are not limited to, hydrochloric, acetic, citric, sulfuric, phosphoric, nitric, sulfonic, orthophosphoric, oxalic, malic, formic, carbonic, oleaic, and stearic. The addition of acid is necessary for pH adjustment. To convert the mercury species to mercury chlorides, the pH should be between about 4 and about 7. If other metals exist in the soil as well, a lower pH is required to remove them. For example, if lead, copper or zinc exist in the soil, a pH between about 2 and 5 should be used to leach the metals present.

Other objects and advantages of the present invention will become readily apparent to those skilled in the art from the following detailed description, wherein only the preferred embodiment of the invention has been shown, simply by way of illustration of the best mode contemplated. As will be realized, the invention is capable of modifications in various aspects, all without departing from the invention. Accordingly, the drawings and description are to be regarded as illustrative in nature, and not as restrictive.

As used herein, the term "liquid mixture" refers to a solution of brine and acid. The term "solid mixture" refers to the mixture of contaminated soil and solid hypochlorite which is fed to the screw reactor.

Referring to the drawings, FIG. 1 is a schematic representation of the mercury recovery process. The contaminated soils are first prepared by excavating and screening the soils to a specific mesh size, such as below 50 mm. The screened soils are then directed to a magnetic separator which removes any unwanted scrap metals and produces main stream soils. The main stream soils are then screened to recover soils that are less than 12.5 mm from the materials with a mesh size that is greater than 12.5 mm. The materials that are larger than 12.5 mm are directed to a crusher to recover any additional soils that have a mesh size below 12.5 mm. All of the soils that are below 12.5 mm are directed to a mixer, where the soils are mixed with solid hypochlorite. The preferred embodiment of this invention uses solid calcium hypochlorite, which may be in the form of powder or pellets.

A brine solution is initially prepared by dissolving sodium chloride or calcium chloride salt in water. The brine solution is mixed with acid to obtain the appropriate pH to produce a liquid mixture. For the recovery of mercury, the pH of the liquid mixture is between about 4 and about 7. The preferred pH value to recover mercury is about 6.2 to about 6.5. To recover other metals, such as lead, copper or zinc, a pH of about 2 to about 5 is necessary. The preferred value to recover the additional metals is about 3 to about 4.8.

The solid mixture is fed to a screw reactor. The liquid mixture is added to the screw reactor in a direction countercurrent to the solid mixture. The leaching hypochlorite solution reacts with the metals to produce metal chlorides and calcium chloride in solution. This configuration forces the soil to be in constant contact with the solid hypochlorite while the liquid stream sweeps the soluble compounds. This allows the reaction to shift kinetically toward equilibrium, converting more mercury compounds to mercury chlorides. Satisfactory results are demonstrated when the concentration of solid hypochlorites is between about 0.10 milligrams to about 3.5 milligrams of solid hypochlorite per about 100 milligrams of mercury in the contaminated soil, using any liquid/solid ratio for the water/soil mixture. The optimum solid hypochlorite concentration is about 1.5 milligrams to about 2.5 milligrams of solid hypochlorite per about 100 milligrams of mercury in the contaminated soil.

The leaching solution will contain soluble formed mercury compounds as well as some fines. According to the United Soil Classification, fines have a mesh size of 0.063 mm. To recover these fines and any other solids that might exist, the solution is directed to a thickener to achieve solid/liquid separation.

The leached soils are directed to a separate thickener for solid/liquid separation and to produce clean soil. The clean fines and clean soil are then combined to produce a soil matrix. The soil matrix is transferred to a vacuum belt filter for drying. The soil matrix is rinsed with brine solution, water or both to recover any residual soluble mercury compounds and to produce clean soil matrix. The clean soil matrix is filtered to recover any solution held in the soil matrix and the clean soil matrix is returned to the site.

The filtered solution is combined with the thickened solutions and treated with a zinc powder or a sulfide compound. After treatment with the zinc or sulfide compound, the resultant solution is filtered to recover a mercury-zinc amalgam or a mercuric sulfide compound. In the case of zinc addition, excess zinc in the solution should be precipitated using calcium or sodium hydroxide. The solution consists of treated brine which is recycled back into the process and is used to produce the liquid mixture.

For the recovery of mercury, the leaching solution has a temperature of about 2° C. to about 60° C., a pH of about 4 to about 7 and a solution potential of about 500 mv to about 1200 mv. When the process is used to recover other metals, in addition to the mercury, the leaching solution has a temperature of about 2° C. to about 60° C., a pH of about 2 to about 5 and a solution potential of about 500 mv to about 1200 mv. For recovery of any of the metals, the retention time of the leaching solution is about 5 minutes to about 200 minutes and the chloride level should be about 2 percent to about 15 percent by weight.

TEST RESULTS

Figure 2:
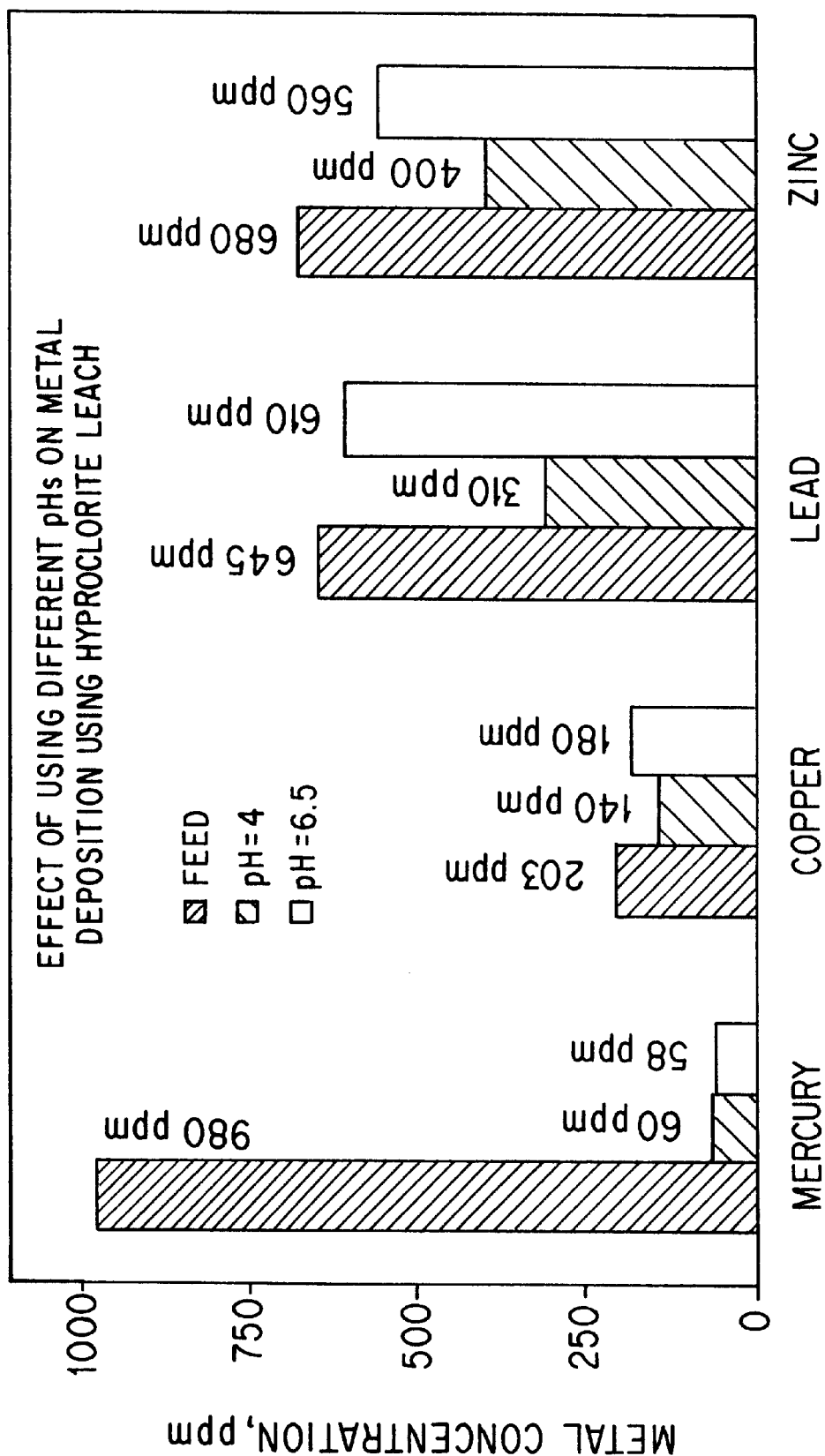
FIG. 2 shows the effect of pH on the leachability of mercury.
Figure 3:
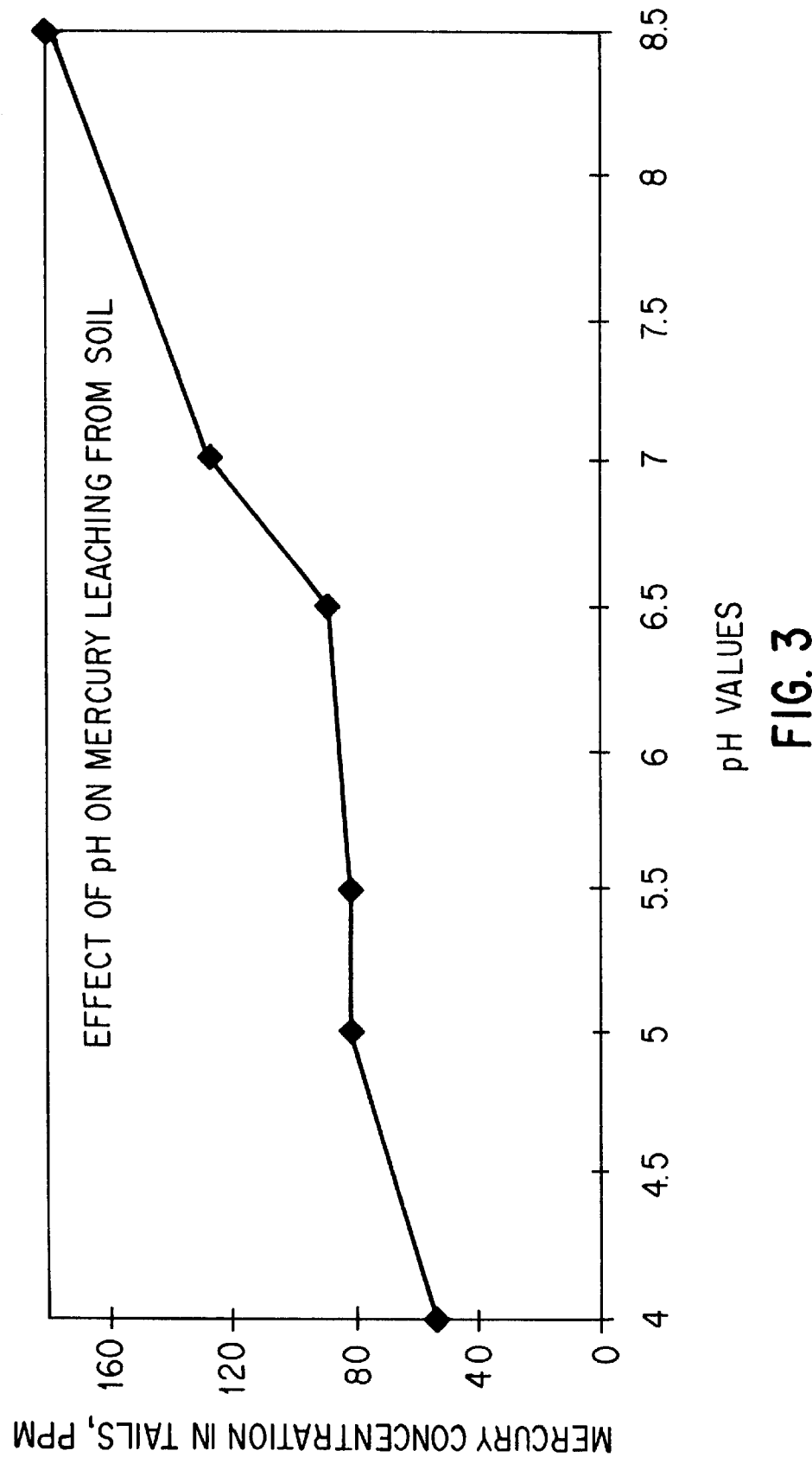
FIG. 3 shows the effect of pH on the leachability of zinc, copper and lead.
Figure 4:
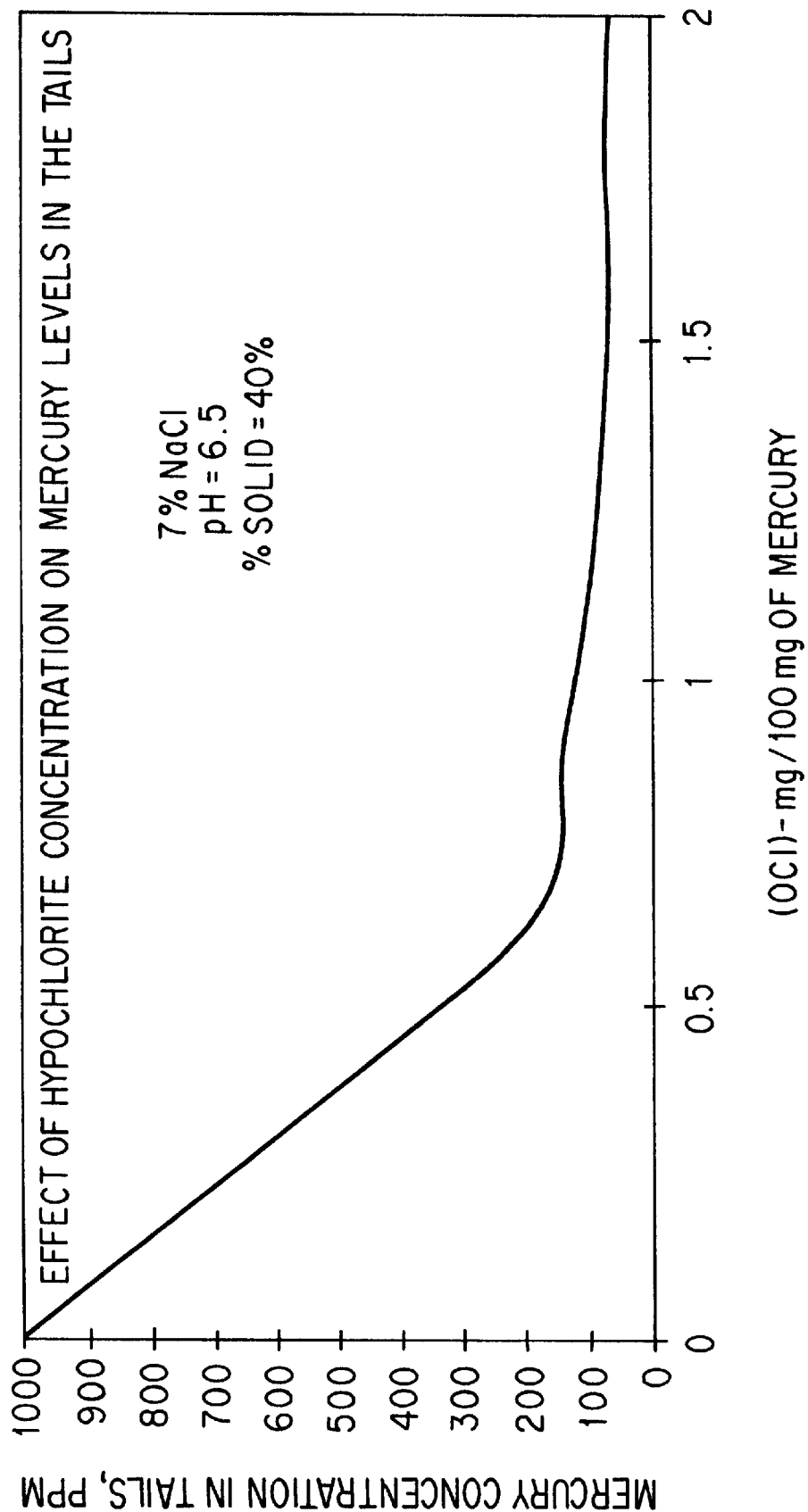
FIG. 4 shows the effect that the solid calcium hypochlorite concentration has on the recovery of mercury from contaminated soils.

FIGS. 2–4 show the effect of changing various parameters using the processes of the invention.

FIG. 2 shows the effect of pH on leaching of about 1000 ppm mercury contaminated soil using about 2000 ppm solid calcium hypochlorite in about 7% sodium chloride solution. The leaching time was about 30 minutes and the pH was adjusted to a range between about 4 and about 7 using sulfuric acid. The cleaned soil was rinsed with about 7 pore volumes of water and analyzed for total mercury content. The optimum pH value for mercury recovery was determined to be between about 4.5 and about 6.5, preferably about 6.2 to about 6.5.

FIG. 3 shows the effect of using different pH levels on metal deposition, such as mercury, zinc, copper and lead, using hypochlorite leaching at low (pH is about 4) and moderate (pH is about 6.5) levels. The term "feed" refers to the soils before treatment. At a low pH of about 4, a reduction of about 93% in mercury, about 35% in zinc, about 55% in lead and about 25% in copper was demonstrated. At a moderate pH of about 6.5, a reduction of about 93% in mercury, about 15% in zinc, about 25% in lead and about 10% in copper was demonstrated.

FIG. 4 shows the effect of different hypochlorite concentrations (in about a 7% sodium chloride solution) on residual mercury in leached soil. A hypochlorite concentration above 1000 ppm is required to produce satisfactory results; the mercury concentration being below 100 ppm. Satisfactory results were demonstrated when the concentration of solid hypochlorites is between about 0.10 milligrams to about 3.5 milligrams of solid hypochlorite per about 100 milligrams of mercury in contaminated soil. The optimum solid hypochlorite concentration is about 1.5 milligrams to about 2.5 milligrams of solid hypochlorite per about 100 milligrams of mercury in the contaminated soil.

What is claimed is:

1. A process for cleaning soils contaminated with mercury comprising:
   a. mixing the mercury-contaminated soils with a solid hypochlorite salt, producing a solid mixture;
   b. preparing a brine solution and mixing the brine solution with acid to adjust the pH, forming a liquid mixture;
   c. directing the solid mixture to a screw reactor;
   d. feeding the liquid mixture to the screw reactor in a direction countercurrent to the solid mixture;
   e. leaching the solid mixture with the liquid mixture, producing leached soils and a solution containing soluble compounds and fines;
   f. thickening the leached soils to separate the soils from the leaching solution;
   g. thickening the leached solution to separate the fines from the solution;
   h. combining the thickened soils and thickened fines to produce a soil matrix;
   i. rinsing the soil matrix with brine solution, water or both to recover any residual soluble mercury compounds and to produce a clean soil matrix;
   j. filtering the clean soil matrix to recover any solution held in the clean soil matrix;
   k. mixing the filtered solution with the thickened solutions from steps (f) and (g) to produce a resultant solution;
   l. treating the resultant solution with zinc powder or sulfide compound to produce clean brine and a mercury-zinc amalgam or a mercuric sulfide compound;
   m. recycling the clean brine back to the process; and
   n. recovering the mercury-zinc amalgam or the mercuric sulfide compound.

2. The process of claim 1, wherein the liquid mixture in step (d) is fed continuously to the screw reactor in a direction countercurrent to the solid mixture.

3. The process of claim 2, wherein the concentration of solid hypochlorite is about 0.1 milligrams to about 3.5 milligrams of solid hypochlorite per 100 milligrams of mercury.

4. The process of claim 3, wherein solid calcium hypochlorite is mixed with the mercury-contaminated soils to produce the solid mixture.

5. The process of claim 4, wherein the acid used to adjust the pH is selected from the group consisting of hydrochloric, acetic, citric, sulfuric, phosphoric, nitric, sulfonic, orthophosphoric, oxalic, malic, formic, carbonic, oleaic, and stearic.

6. The process of claim 5, wherein the acid used to adjust the pH is selected from the group consisting of sulfuric, hydrochloric, phosphoric, citric and acetic.

7. The process of claim 6, wherein the leaching solution has a retention time of about 5 minutes to about 200 minutes, a temperature of about 2° C. to about 60° C., and a pH of about 4 to about 7 with a solution potential of about 500 mv to about 1200 mv.

8. The process of claim 7, wherein sodium chloride, calcium chloride or a mixture of both is added to the leaching solution to maintain a chloride level of about 2 percent to about 15 percent by weight.

9. The process of claim 8, wherein the pH of the leaching solution is about 6.2 to about 6.5.

10. The process of claim 1, wherein the mercury contaminated soils also contain metals selected from the group consisting of zinc, lead and copper.

11. The process of claim 10, wherein the liquid mixture in step (d) is continuously fed to the screw reactor in a direction countercurrent to the solid mixture.

12. The process of claim 11, wherein the concentration of solid hypochlorite is about 0.1 milligrams to about 3.5 milligrams of solid hypochlorite per 100 milligrams of mercury.

13. The process of claim 12, wherein solid calcium hypochlorite is mixed with the mercury-contaminated soils to produce the solid mixture.

14. The process of claim 13, wherein the acid used to adjust the pH is selected from the group consisting of hydrochloric, acetic, citric, sulfuric, phosphoric, nitric, sulfonic, orthophosphoric, oxalic, malic, formic, carbonic, oleaic, and stearic.

15. The process of claim 14, wherein the acid used to adjust the pH is selected from the group consisting of sulfuric, hydrochloric, phosphoric, citric and acetic.

16. The process of claim 15, wherein the leaching solution has a retention time of about 5 minutes to about 200 minutes, a temperature of about 2° C. to about 60° C., and a pH of about 2 to about 5 with a solution potential of about 500 mv to about 1200 mv.

17. The process of claim 16, wherein sodium chloride, calcium chloride or a mixture of both is added to the leaching solution to maintain a chloride level of about 2 percent to about 15 percent by weight.

18. The process of claim 17, wherein the pH of the leaching solution is about 3.0 to about 4.8.

* * * * *